(12) United States Patent
Schack et al.

(10) Patent No.: US 11,892,300 B2
(45) Date of Patent: Feb. 6, 2024

(54) METHOD AND SYSTEM FOR DETERMINING A MODEL OF THE ENVIRONMENT OF A VEHICLE

(71) Applicant: Volkswagen Aktiengesellschaft, Wolfsburg (DE)

(72) Inventors: Moritz Schack, Braunschweig (DE); Christian Merfels, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 215 days.

(21) Appl. No.: 17/286,690

(22) PCT Filed: Oct. 2, 2019

(86) PCT No.: PCT/EP2019/076784
§ 371 (c)(1),
(2) Date: Apr. 19, 2021

(87) PCT Pub. No.: WO2020/078727
PCT Pub. Date: Apr. 23, 2020

(65) Prior Publication Data
US 2021/0341293 A1    Nov. 4, 2021

(30) Foreign Application Priority Data
Oct. 18, 2018    (DE) .............. 10 2018 217 840.2

(51) Int. Cl.
*G01C 21/00* (2006.01)
*G01C 21/28* (2006.01)
(Continued)

(52) U.S. Cl.
CPC .......... *G01C 21/28* (2013.01); *G01C 21/3867* (2020.08); *G06T 7/70* (2017.01); *G06V 20/56* (2022.01); *G06T 2207/30252* (2013.01)

(58) Field of Classification Search
CPC ...... G01C 21/28; G01C 21/3867; G06T 7/70; G06T 2207/30252; G06V 20/56
(Continued)

(56) References Cited

U.S. PATENT DOCUMENTS 8,184,861 B2    5/2012    Nakamura et al.
9,970,772 B2    5/2018    Zeng et al.
(Continued)

FOREIGN PATENT DOCUMENTS

| CN | 101275852 | | 10/2008 |
|---|---|---|---|
| CN | 106780612 | A | 5/2017 |

(Continued)

OTHER PUBLICATIONS

German Office Action, Application No. 102018217840.2, 7 pages, dated May 27, 2019.

(Continued)

*Primary Examiner* — Tyler J Lee
*Assistant Examiner* — Tiffany P Ohman
(74) *Attorney, Agent, or Firm* — Slayden Grubert Beard PLLC

(57) ABSTRACT

The invention relates to a method for determining a model of the environment of a vehicle, in which method an initial position estimate for the vehicle is acquired and map data are acquired, wherein the map data comprise information about the spatial arrangement of geographical areas, and the geographical areas are assigned to different area categories. Environmental data within an acquisition space is acquired, and objects are detected using the environmental data, wherein an object position and an object category are assigned to each detected object. The environmental model is determined using the detected objects. Assignment rules are provided which define the assignment of the object (Continued)

categories to the area categories, wherein the objects are detected in accordance with the assignment rules.

17 Claims, 3 Drawing Sheets

(51) Int. Cl.
   *G06T 7/70* (2017.01)
   *G06V 20/56* (2022.01)
(58) Field of Classification Search
   USPC .......................................................... 701/450
   See application file for complete search history.

(56) References Cited

U.S. PATENT DOCUMENTS

| | | | |
|---|---|---|---|
| 2013/0229525 A1 | 9/2013 | Nagaoka et al. | |
| 2014/0379247 A1* | 12/2014 | Ferguson | B60W 30/16 |
| | | | 701/301 |
| 2017/0008521 A1 | 1/2017 | Braunstein et al. | 701/93 |
| 2017/0184407 A1 | 6/2017 | Yamashiro | 701/300 |
| 2017/0337435 A1 | 11/2017 | Uliyar et al. | |
| 2017/0350712 A1 | 12/2017 | Tateishi et al. | |
| 2018/0003505 A1 | 1/2018 | Tateishi | |
| 2019/0331499 A1 | 10/2019 | Alawieh et al. | |
| 2021/0237769 A1* | 8/2021 | Ostafew | G08G 1/163 |

FOREIGN PATENT DOCUMENTS

| | | | |
|---|---|---|---|
| DE | 102013211109 A1 | 12/2014 | ............ B60W 40/02 |
| DE | 102014204383 A1 | 9/2015 | ............... G06K 9/64 |
| DE | 102016203086 A1 | 8/2017 | |
| DE | 102017201669 A1 | 8/2018 | ............. G01C 21/26 |
| DE | 102018217840 A1 | 4/2020 | ............ B60W 40/02 |
| EP | 0678228 B1 | 7/2004 | ............. H04B 7/185 |
| EP | 3078937 A1 | 10/2016 | ............. G01C 21/30 |
| JP | 2008051612 A | 3/2008 | ............. G01C 21/00 |
| JP | 2014145666 A | 8/2014 | ............. G01C 21/34 |
| WO | 2020/078727 A1 | 4/2020 | ............. G01C 21/28 |

OTHER PUBLICATIONS

International Search Report and Written Opinion, Application No. PCT/EP2019/076784, 17 pages, dated Jan. 8, 2020.
European Office Action, Application No. 19783490.6, 5 pages, dated Oct. 31, 2023.
Chinese Office Action, Application No. 201980084668.X, 15 pages, dated Nov. 17, 2023.

* cited by examiner

METHOD AND SYSTEM FOR DETERMINING A MODEL OF THE ENVIRONMENT OF A VEHICLE

CROSS-REFERENCE TO RELATED APPLICATIONS

This application claims priority to German Patent Application No. DE 10 2018 217 840.2, filed on Oct. 18, 2018 with the German Patent and Trademark Office. The contents of the aforesaid Patent Application are incorporated herein for all purposes.

TECHNICAL FIELD

The present invention relates to a method for determining a model of the environment of a vehicle. The invention furthermore relates to a system for determining a model of the environment of a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Incorrect detections repeatedly occur when detecting objects by sensors and systems of vehicles. For example, data can be misinterpreted when for example the side surface of a truck is held to be a house wall, or an incorrect assignment can occur when for example a bicycle path marker is held to be the marker of a route on the street. If navigation is performed or a vehicle position is determined using the detected objects, this can produce faulty results.

SUMMARY

An object exists is to provide a method, a system and a computer program product that permit highly reliable detection of objects in the environment of a vehicle.

The object is solved by a method, a system, and a computer program product having the features of the independent claims. Embodiments of the invention are discussed in the dependent claims and the following description.

DESCRIPTION

Figure 1:
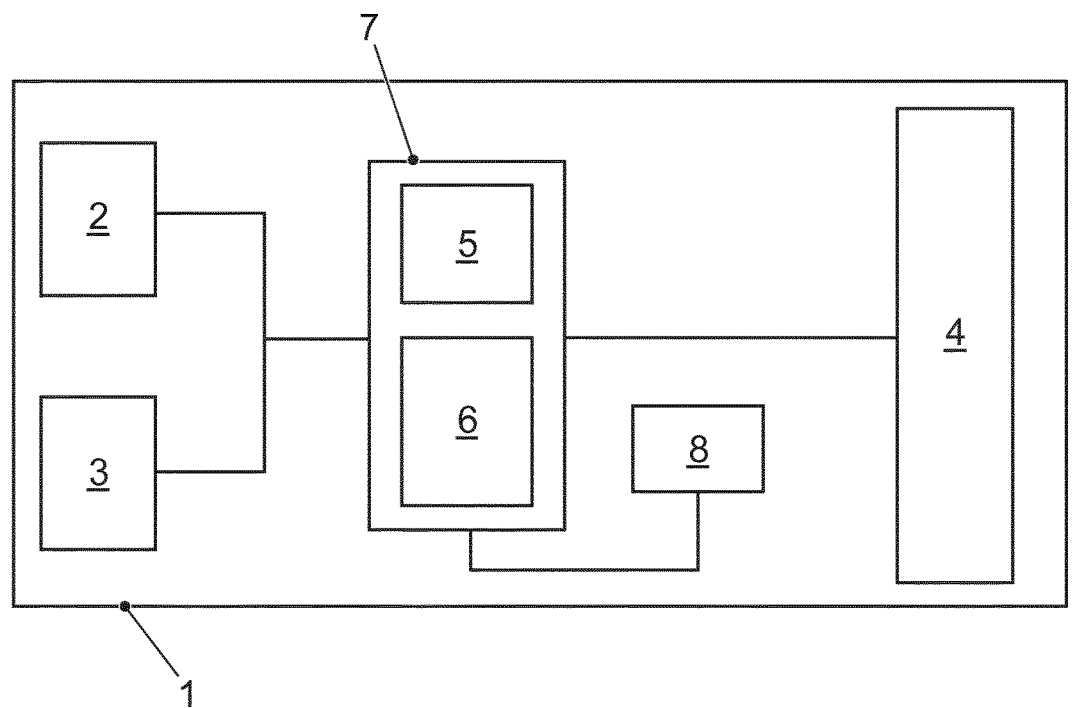
FIG. 1 shows a vehicle with an exemplary embodiment of a system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary aspect, assignment rules are provided which define an assignment of the object categories to the area categories, wherein the objects are detected in accordance with the assignment rules.

This may, e.g., allow detections of objects to be recognized as faulty and filtered out if the recognized objects do not occur within particular areas.

An "environmental model" within the context of the present teachings includes information on the spatial environment of the vehicle. It may include for example information on an arrangement of objects relative to the vehicle and relative to each other. It may furthermore for example include information on parameters of the objects such as an orientation, length or height, width, an angle or radius.

The environmental model reproduces for example the environment of the vehicle at a particular position or pose. The term "position" will be used in the following in such a manner that it also includes a "pose", i.e., a combination of the position and orientation in space.

In some embodiments, the area categories include at least one drivable area, one undrivable area, one roadway area, one developed area and/or one vegetation area. Areas can thereby be distinguished that are of particular relevance to a model of the environment of the vehicle. Alternatively or in addition, other area categories can be provided.

Accordingly, the map data may for example include information that a particular area is a road, wherein the area category of "road" may simultaneously be assigned to the category of "drivable area". Other areas may also be arranged within the area categorized as a road, for example a plurality of different lanes, an emergency lane or an edge area. Furthermore, a particular area may be categorized as a "developed area" in which for example buildings are located. Another area may for example be categorized as a "footpath" and "undrivable".

By using the initial position estimate, the arrangement of the areas relative to the vehicle may be determined. For example, the vehicle may be located on a road in a particular position, and the distance and direction in which the other areas are arranged relative to the vehicle may be determined using the map data.

In some embodiments, a precision of the initial position estimate is determined, and an arrangement of the geographic areas relative to the vehicle is determined depending on the precision. Consequently, an optimum use of the available data is ensured even given position estimates of varying accuracy.

The method determines for example how the geographic areas defined by the map data are arranged relative to the vehicle. The initial position estimate is used to determine the position, or respectively the pose of the vehicle within the reference system of the map data. The precision of the initial position estimate may be determined in a manner known per se. It may furthermore be stipulated, for example for particular positioning methods, or the precision may be output, for example as an error range or confidence interval by an apparatus for determining the position.

This shows how the different areas are arranged relative to the vehicle. The method may take into account that for example the arrangement of the areas may be determined with a corresponding reduced precision, for example given a reduced precision of the vehicle's position estimate. For example, areas and their arrangement relative to the vehicle are determined in which the affiliation with a particular area defined in the map data cannot be precisely determined. It may be provided to modify the assignment rules in such areas in order to deal with ambiguous assignments.

The environmental data are acquired in a manner known per se, for example by means of sensors. For example, lidar, radar or ultrasonic sensors may be used; furthermore a camera may be used. Moreover other sensors may be used, for example including combinations of different sensors. The acquisition space in which environmental data are acquired is for example defined as the spatial area in which the employed sensor data may be acquired, for example a range or a visibility of the sensors. It may be provided that the acquisition space is adaptable, for example by restricting the acquisition of environmental data to a particular spatial area.

The objects may also be detected in the environmental data in a manner known per se, for example by means of pattern recognition. In the method, for example semantically defined objects are detected, i.e., objects that are recognizable as independent units and are assigned to particular object categories.

The assignment to the object categories also occurs in a manner known per se, wherein at least one object category is assigned to each detected object. For example, a distinction is made between static and dynamic objects, wherein static objects are in a fixed arrangement within the coordinate system of the map data for a longer time, such as traffic facilities, buildings, road markers or elements of vegetation. For example, these can be so-called "landmarks". Dynamic objects may for example be other road users or objects temporarily located at a particular position. When detecting an object, furthermore a position of the object is determined relative to the vehicle, such as a distance and an angle at which the object was acquired.

The rules of assignment may be provided in various ways known per se. They may for example be stipulated by a memory unit or received by an external unit. For example, the map data may include assignment rules, or the assignment rules can be acquired together with the map data. Alternatively or in addition, the assignment rules may be acquired by entries from a user. Moreover, methods of machine learning may be used to determine the assignment rules.

In some embodiments, a negative assignment for a specific area category and a specific object category is determined using the assignment rules. Objects that are assigned to the specific object category are detected using the environmental data that do not relate to any geographic areas which are assigned to the negatively assigned specific area category. This may ensure that no objects are taken into account in the environmental model that are based on erroneous detections, and detection may be performed more efficiently.

The negative assignment of specific object categories and area categories determined using the assignment rules excludes particular object data categories from particular area categories. In order to detect objects from the specific object category, environmental data with a smaller scope may therefore be used, which renders the detection step faster and more efficient. The environmental data may for example be filtered in order to exclude areas of the negatively assigned area category. It may be furthermore provided that no environmental data are acquired in areas that are assigned to a negatively assigned area category.

For example, objects in the category of "road markers" may be negatively linked to areas in the category of "house wall". To detect road markers, the environmental data may then be filtered so that no environmental data detected in the area of house walls are taken into account. It may also be provided to drive a sensor so that it does not acquire any environmental data in the area of house walls.

Alternatively or in addition, detected objects may be rejected when they are assigned to a particular object category and are detected in an area for which this object category is excluded.

Moreover, it may be conversely provided that specific object categories are positively linked to specific area categories. Objects in these object categories are consequently only detected and accepted for further processing when they are located in areas of the positively linked area categories. The positive assignment may be employed to intentionally use environmental data from areas of particular area categories in order to detect objects of a particular object category, and to exclude other areas. This also leads to a reduction of the data to be processed.

Analogous to the above example, objects in the category of "road markers" may be positively linked to areas in the category of "road surface". In order to detect road markers, the environmental data may then be filtered so that environmental data acquired only in the area of the road surface are taken into account. It may also be provided to drive a sensor so that it for example acquires environmental data in the area of the road surface.

In some embodiments, provisional detections are initially determined while detecting the objects, and the provisional detections are filtered using the assignment rules. Consequently, the detections are checked using the assignment rules.

When filtering, for example the object category to which each of the objects belongs, and the area category to which the position of the detected object is assigned, are checked. If the object and area category are mutually exclusive, the detected object is rejected and not taken into account when determining the environmental model. If contrastingly the object and area category are positively assigned to each other, the detected object is taken into account.

In some embodiments, a subset of the acquired environmental data is determined while detecting the objects using the assignment rules, and the objects are detected using the subset of the environmental data. This allows the processing of the environmental data to be configured very efficiently since unnecessary environmental data are not used for detection, and processing in real-time, or respectively at a sufficient speed can be ensured for use during vehicle travel.

For example, it may be provided that objects from a particular object category should be intentionally detected. By using the assignment data, the area categories to which these objects are positively linked may be determined, i.e., the areas in which the desired objects may be detected. By using the map data, it is determined how the areas of the corresponding area categories are arranged relative to the vehicle. The acquired environmental data are processed so that a subset is formed which is substantially restricted to these areas. This may be performed for example by filtering. In doing so, the environmental data are reduced. It may for example be provided that road markers are only detected in the area of the road surface, and other areas such as developed areas are excluded from detection.

In some embodiments, the acquisition space in which the environmental data are acquired is formed using the assignment rules. Beneficially, the acquired data are thereby restricted to the needed scope. In contrast to the above-explained instance in which the acquired environmental data are reduced to a suitable subset, the reduction may already occur during acquisition in this case. For example, a solid angle can be limited within which data is recorded.

In this case as well, it may be taken into account that the position is initially estimated with a particular imprecision, and the relevant area must therefore be chosen to be larger in order to be able to acquire all relevant objects.

In some embodiments, the detected objects are static objects. These are very well suited for use in a position determination. The static objects are assigned to particular object categories that are designated as being static. They have basically constant properties, such as a fixed position and orientation, size, height, width or an arrangement relative to each other.

For example, the object categories may include posts, stakes, traffic structures, elements of a peripheral development, road markers, signs and traffic signals. Such elements are widespread in the environment of roads and are therefore universally useful.

The initial position estimate may be carried out by a manner known per se, for example by means of a global navigation satellite system such as GPS. The position or pose of the vehicle may be determined in this context in various coordinate systems, for example in a global coordinate system or in a coordinate system relative to a particular reference point. Moreover, methods known per se to optimize positioning may be used, for example by means of landmarks. The initial position estimate may furthermore be generated by an external unit and received by the vehicle, for example provided by other road users or a traffic monitoring apparatus.

In some embodiments, an optimized position estimate for the vehicle is determined using the initial position estimate and the environmental model. The optimized position estimate may be used as a new initial position estimate in an iterative implementation of the method, such as for an update and a new determination of a further optimized position estimate or the environmental model. The environmental model may be used in order to determine the position, or respectively pose of the vehicle very precisely.

The optimized position estimate is for example indicated in a global coordinate system or in a coordinate system of the map data. For example, a map comparison is performed in which the information included in the map data is compared with the actually detected objects using landmarks, in particular detectable objects. In doing so, an optimization problem is solved for example in which the positions of the detected objects are very well approximated by the landmarks included in the map data. The position and orientation of the vehicle in the coordinate system of a map may therefore be determined using the relationship of the position and orientation of the vehicle relative to the arrangement of the detected objects.

In some embodiments, the detected objects include dynamic objects. Detections of dynamic objects may therefore be checked for plausibility.

For example, the object categories to which dynamic objects are assigned may include other road users. The method according to the teachings herein may be used in this case to ensure that such objects are only detected in permissible areas, and erroneous detections as well as inappropriate reactions to erroneous detections are avoided. For example in known methods, the difficulty arises that the irregular forms of vegetation at the edge of a roadway leads to erroneous recognitions of other road users in these areas. For example, a vehicle may lead to the erroneous recognition of a vehicle located in the area of vegetation.

Dynamic objects may be included in the environmental model or processed in addition thereto, for example to transmit them to a driver assistance system.

The map data may be acquired in a manner known per se, for example by being called from a memory unit of the vehicle, for example as part of a navigation system. In some embodiments the map data are at least partially received from an external unit. This may for example be an external server or backend apparatus that is connected to the vehicle at least temporarily by a data link. To accomplish this, a data link is established between the vehicle and the external unit, for example through a data network such as the Internet, and the map data may be requested and received by the vehicle. Consequently, always current map data may be provided.

The map data are in particular acquired using the initial estimate of the position of the vehicle, for example so that the map data relate to a geographic area in the surroundings of the vehicle, for example within a particular minimum radius around the initially estimated position of the vehicle. The map data may furthermore relate to a geographic area in which the vehicle will probably be located in the future, wherein for example a planned route may be taken into account. This allows map data to be acquired beforehand in a timely manner before they are relevant at a later time.

In the present aspect, the map data are configured so that they include information on at least two geographic areas and their spatial arrangement. For example, the arrangement of the geographic areas relative to each other and/or within a particular global or relative coordinate system can be included. The map data include in particular information on the limits of particular areas by which the shape and position of the geographic areas are defined. The geographic areas may be defined as flat structures or as points or lines, wherein points and lines may in particular be assigned a width, radius and/or other information beyond their surface coverage.

The map data furthermore include information on area categories to which a geographic area is assigned. The area categories may be configured so that an area category is provided for each of the areas of the map data. A plurality of area categories may also be assigned a geographic area.

The map data may furthermore be updated by providing update data from an external unit as needed. Moreover, map data may be requested when the vehicle enters a particular geographic area, wherein such an area may for example be determined using a planned route of a navigation system.

The data received by the external unit may also include supplementary information, for example information on the arrangement of geographic areas, their assignment to area categories or assignment rules.

In some embodiments, transmission data may be formed using the particular environmental model and transmitted to an external unit such as a server or a backend apparatus. The environmental model generated for a vehicle may therefore be used for other purposes.

For example, the environmental model or part of the information included therein may be provided to another road user. Furthermore, it may be checked if existing map data correspond with the environmental model or need an update. If for example several vehicles note deviations between the actually detected objects and the map data, for example when a development or a route has changed, these deviations may therefore be recognized. The map data may subsequently be corrected or updated, for example by instigating a new acquisition or by evaluating the information in the environmental model of the vehicle.

According to a second aspect, a system is provided, having a detection unit that is configured to detect the objects depending on assignment rules, wherein the assignment rules define an assignment of the object categories to the area categories.

The system according to the present aspect is designed in particular to implement the method described above.

In some embodiments of the system, the environmental data acquisition unit includes a lidar, radar or ultrasonic sensor, or a camera for visible or infrared light. Furthermore, other sensor types can be included, or combinations of several sensors and sensor types may be provided. In this manner, a plurality of vehicle sensors that already may exist can be used to acquire the environmental data.

In another aspect, a computer program product includes instructions that, when executed by means of a computer, cause the computer to execute the above-described method according to the first aspect or one or more of the embodiments described in the context of the first aspect.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

With respect to FIG. 1, a vehicle will be explained with an exemplary embodiment of a system for determining an environmental model for a vehicle.

The vehicle 1 includes a position acquisition unit 2, a map data acquisition unit 3 and an environmental data acquisition unit 4. The position acquisition unit 2 includes a GPS module in the exemplary embodiment. The map data acquisition unit 3 includes an interface with a memory unit (not shown) that provides map data for retrieval. In other exemplary embodiments, the map data acquisition unit 3 can be configured as an interface with an external unit from which map data or supplementary map data can be retrieved. In the exemplary embodiment, the environmental data acquisition unit 4 includes a camera that is arranged in the front area of the vehicle 1 and acquires image data on the area lying in front of the vehicle 1. In other exemplary embodiments, other sensors can be provided alternatively or in addition, such as an infrared camera, a 3D camera or an ultrasonic, radar or lidar sensor.

The vehicle 1 furthermore includes a computing unit 7 that in turn includes a detection unit 5 and an environmental model determining unit 6. The computing unit 7 is coupled to the positioning acquisition unit 2, the map data acquisition unit 3 and the environmental data acquisition unit 4. The computing unit 7 is furthermore coupled to a driver assistance system 8.

In the exemplary embodiment, the driver assistance system 8 includes a module for the at least partially autonomous control of the vehicle 1. Different driver assistance systems 8 that are known per se can be provided.

Figure 2:
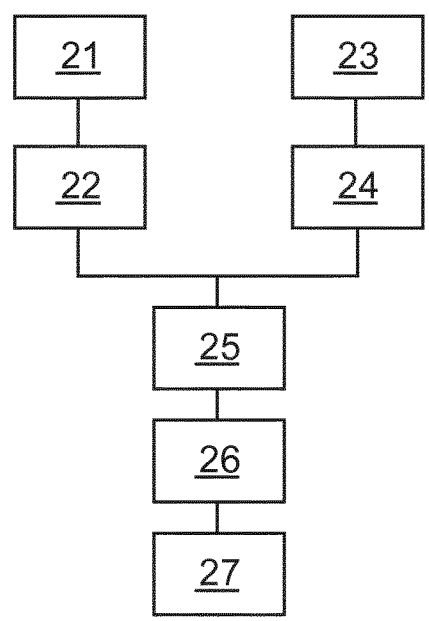
FIG. 2 shows an exemplary embodiment of a method.

An exemplary embodiment of the method will be explained with reference to FIG. 2. In doing so, the aforementioned exemplary embodiment of the system will be referenced and will be further specified by the description of the method.

An initial position estimate is acquired in a step 21. In the exemplary embodiment, this is done using the positioning acquisition unit 2 with its GPS module. Different methods for positioning that are known per se can be used, wherein in particular an indication of the precision of this estimate is also provided together with the position estimate. In the exemplary embodiment, positioning also includes the determination of the orientation of the vehicle, i.e., the pose of the vehicle is determined.

In another step 22, map data are acquired. In the exemplary embodiment, by using the initial position estimate, map data are acquired on a geographic area in a particular area around the vehicle 1. Alternatively or in addition, in other exemplary embodiments map data can be acquired on a geographic area that the vehicle 1 will probably travel in the future, for example because a route to this area is planned.

The map data include information on the position and arrangement of geographic areas, as well as information on the area categories to which the individual areas are assigned. For example, information on the route of streets and roadways is included along with their width or other spatial extent. Furthermore information is included in the exemplary embodiment on where buildings are located next to a road. Examples of area categories are for example drivable and undrivable areas, a roadway area, a developed area or a vegetation area. The arrangement of the areas will be further explained with reference to FIG. 3A to 3D.

In one step 23, environmental data are acquired, wherein the camera of the environmental data acquisition unit 4 is used for this in the exemplary embodiment.

In another step 24, objects are detected using the environmental data, in particular using known methods for pattern recognition, for example to detect landmarks. In doing so, in particular methods of machine learning or artificial intelligence can also be used. If an object is detected in the environmental data, a position and an object category are assigned to it. Moreover, it can be provided that other features are determined such as an orientation, a size, length, width or coloration of an object. The assignment to an object category is carried out in particular using the features detected for an object. Examples of object categories are for example posts, stakes, traffic structures, elements of a peripheral development, road markers, signs or traffic signals.

In the exemplary embodiment, in particular static objects are detected that are assigned to corresponding static object categories. In other exemplary embodiments, dynamic objects can be detected alternatively or in addition. Examples of dynamic object categories are other road users, passenger cars, trucks, pedestrians or bicycles.

In one step 25, the detected objects are filtered. For this, assignment rules are acquired that are provided by the map data acquisition unit 3 in the exemplary embodiment. The assignment rules include a positive and/or negative assignment of object categories and area categories. In particular, it is defined that objects of a particular object category should not be detected in areas of a particular area category. For example, it can be assumed that no building edges are located on a roadway. In the present exemplary embodiment, these objects are therefore rejected in step 25.

In one step 26, an environmental model for the vehicle 1 is determined using the detected objects. This includes the positions and in particular also the orientations of the detected objects relative to the vehicle 1. It furthermore includes information on the objects, in particular the object categories assigned to them. The environmental model can include additional information.

An optimization of the initial position estimate is performed, in particular by means of a map comparison. In doing so, an optimization problem is solved in which the detected objects whose position relative to the vehicle 1 and relative to each other have been determined are overlapped with the positions that are included in the map data for the objects. This is done in a manner known per se, in particular using methods for positioning by means of landmarks. In this manner, an optimized position is determined and in particular also an orientation of the vehicle 1 in the coordinate system of the map data.

In another step 27, the optimized position is output to the driver assistance system 8, for example in order to partially or completely autonomously control the vehicle 1.

Other exemplary embodiments provide that the precision of the initial position estimate is taken into account while filtering the detected objects. For example, with respect to a position relative to the vehicle 1, it cannot be precisely determined if the position belongs to an area of a first area category or to a secondary area category. The assignment rules can be applied in this case so that for example objects of a particular object class are accepted at a position, even though they are located with a certain probability in an area in which they should not be detected. Conversely, it can be provided that detected objects are rejected in such cases of doubt. Moreover when detecting a particular object, a method can be provided in which a plausibility check is performed, for example in which corresponding objects in the map data are sought, in particular at a position that is not clearly assigned to an area category. In this manner, it can be determined whether a particular detection of an object is plausible, and whether the object should therefore be taken into account in the environmental model or rejected.

When determining the environmental model, a difficulty can exist in that a position is to be determined using the environmental model, and an initial position estimate is simultaneously assumed. It can be provided that the optimized position is used in an iterative method in order to improve the initial position estimate in a next step. Furthermore, the imprecision of the initial position estimate can be taken into account in various ways, for example by checking individual detected objects at the same time as assigning them to particular area categories.

In another exemplary embodiment, the assignment rules include a positive assignment between object categories and area categories. In this case, the assignment rules define that objects of a particular object category are only found in areas that belong to a particular area category. It can furthermore be provided that the areas in which objects of a particular object category are to be sought, or respectively not detected, are already taken into account while detecting the objects. In this case, a filtering of the acquired environmental data is performed so that only such data are taken into account that were acquired in suitable areas. That is, the environmental data are restricted to a subset so that only environmental data of such areas are analyzed that are positively, or at least not negatively, linked to a particular object category. In this way, the data volume within which objects are to be detected is reduced, which significantly decreases the computing time in particular in involved methods for pattern recognition. In this way, the method can be better performed in real time, or respectively within the runtime, i.e., during the operation of the vehicle 1.

In other exemplary embodiments, the environmental data acquisition unit 4 is adjusted so that environmental data are only acquired in particular spatial areas. In order to acquire objects of a particular object category, it is then provided that environmental data are only acquired in areas that are positively or at least not negatively linked to the object category. In this way, the amount of data to be processed is reduced.

The exemplary embodiment of the method for determining an environmental model for a vehicle will be explained in detail with reference to FIG. 3A to 3D in an example of a traffic situation. The above-explained exemplary embodiments of the system and the method will be assumed.

Figure 3A:
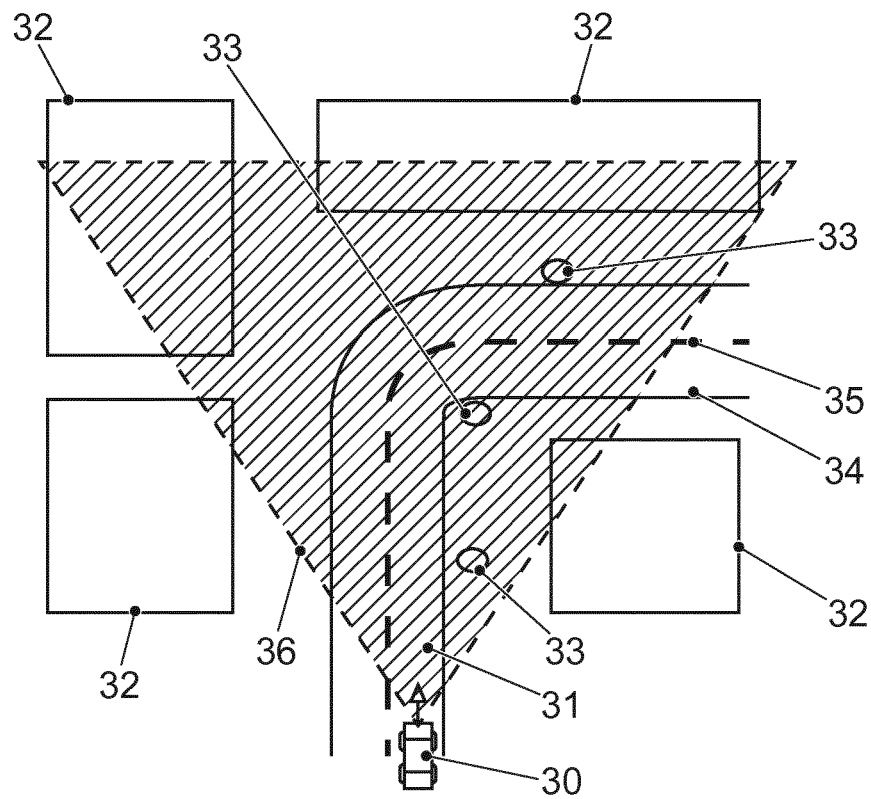
FIG. 3A to 3D show an exemplary embodiment of a traffic situation in which the method can be executed.

FIG. 3A shows a depiction of the ego vehicle 30 on a roadway 31. An arrow symbol symbolizes the forward direction of the vehicle 30. Furthermore, an acquisition space 36 of the environmental data acquisition unit 4 is indicated that extends forward from the vehicle 30 symmetrically at a particular angle. In particular depending on the employed sensors of the environmental data acquisition unit 4, the acquisition space 36 can be designed differently, in particular with respect to the opening angle, the direction, the range and the dependency on environmental conditions such as visibility.

A lane marker 35 running in the middle is applied to the surface of the roadway 31 in the exemplary embodiment, and the roadway 31 is bordered on the side by a curb 34. In the exemplary embodiment, the roadway 31 describes a right curve. Posts 33 are arranged next to the roadway 31 which can be identified as guideposts, in particular by using their thickness and height. Furthermore, buildings 32 are arranged on the side next to the roadway 31.

In the exemplary embodiment, the map data that are acquired by means of the map data acquisition unit 3 include information on the route and the spatial extent of the roadway 31, the lane marker 35, the presence of, and particular features of, the curb 34, the posts 33 as well as the building 32. In particular, the map data include information on the arrangement of particular areas, as well as their assignment to particular area categories. This will be explained in greater detail below with reference to FIG. 3B to 3D.

Figure 3B:
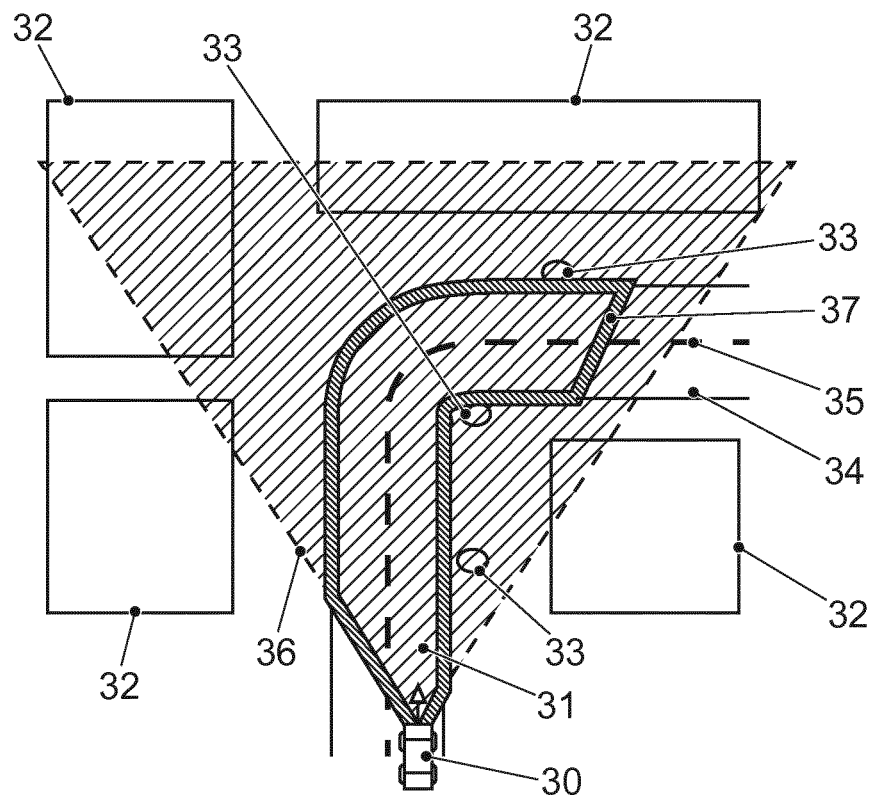

In FIG. 3B, a drivable area 37 is highlighted, or respectively the intersection of such a drivable area 37 with the acquisition space 36. The drivable area 37 extends over the surface of the roadway 31. Positions within this area are assigned to the area category of "drivable area". In the exemplary embodiment, particular object categories such as objects of the category of "posts" or "building edges" should not be detected in this case, i.e., such detections are rejected as erroneous detections. On the other hand, this area category is positively linked to other object categories, for example the category of "road markers". To detect the road marker 35, it is therefore provided in the exemplary embodiment that only a subset of the acquired environmental data is analyzed which includes the drivable area 37. Another example of an object category can for example be a "preceding vehicle" whose detection is only anticipated in the drivable area 37 and not for example in the area of the building 32.

Figure 3C:
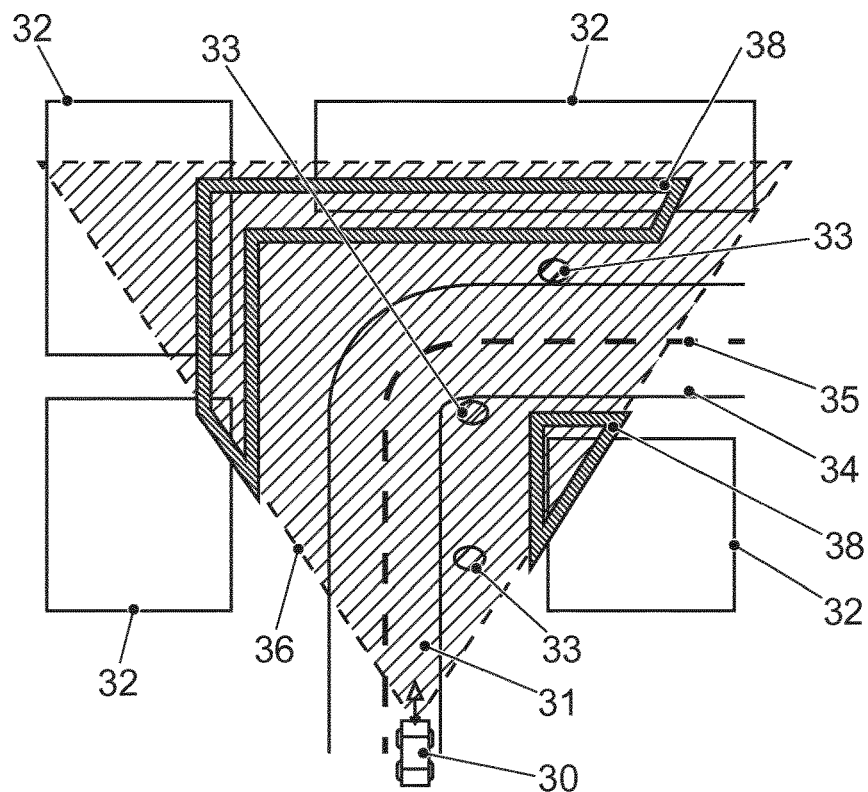

A building front area 38 is highlighted in FIG. 3C that is arranged at a certain distance from the roadway 31 and along the building 32. The arrangement of the building front area 38 can for example be included in the map data, or a unit of the vehicle 1 can determine where the building fronts 38 are arranged using the position of the building 32 included in the map data. In this case, edges, facade structures or other features of buildings 32 can for example be detected as static objects. The building front area 38 can be positively linked to object categories in which features of the building 32 are detected; it can be negatively linked to object categories that for example relate to other road users. Analogous to the above-described procedure, only a subset of the acquired environmental data that includes the building front area 38 can be analyzed in order to detect building edges and corners.

Figure 3D:
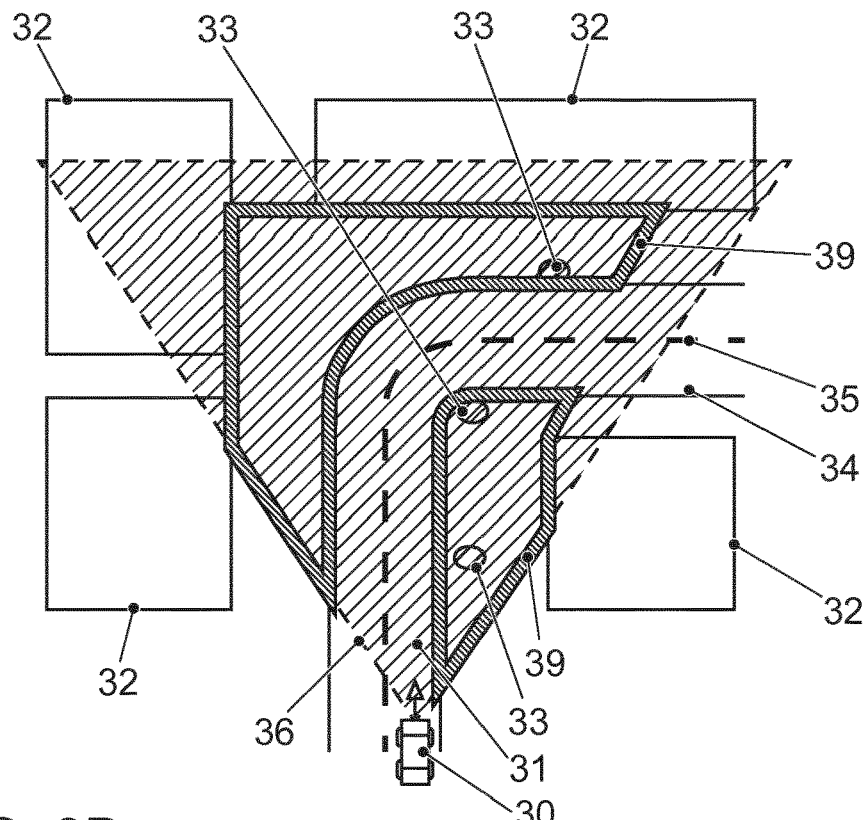

A roadway edge area 39 is highlighted in FIG. 3D that is arranged adjacent to, at a slight distance from, or with a slight overlap with the roadway 31. The posts 33 are for example arranged in this roadway edge area 39. Furthermore, the curb 34 can be found in this area. It can be correspondingly provided that these objects are only detected in a corresponding subset of the environmental data with the roadway edge area 39. Other exemplary objects can for example be pedestrians who are located on a footpath in the roadway edge area 39; analogously, bicyclists can be detected on a bike path. By a suitable definition of the areas, it can for example be ensured that markers on a roadway that is located in the roadway edge area 39 are not interpreted as being relevant to the driving of the vehicle 1, whereas the lane marker 35 in the drivable area 37 is simultaneously recognized as being relevant.

Another exemplary embodiment provides that the vehicle 1 includes an interface with an external unit. Map data or supplementary data as well as assignment rules are acquired by the external unit. These can be designed as external server or as backend apparatuses. Furthermore, a transmission of data from the vehicle 1 to the external unit is provided, for example to enable an evaluation of map data when for example the plausibility of the map data is being checked using the acquired environmental data or the environmental model generated by the vehicle 1.

LIST OF REFERENCE NUMERALS

1 Vehicle
2 Position acquisition unit
3 Map data acquisition unit
4 Environmental data acquisition unit
5 Detection unit
6 Environmental model determining unit
7 Computing unit
8 Driver assistance system
21 Acquisition of an initial position estimate
22 Acquisition of map data
23 Acquisition of environmental data
24 Detection of objects
25 Filtering of detected objects
26 Determination of an environmental model, position optimization
27 Output of the optimized position
30 Ego vehicle (icon)
31 Roadway
32 Static object, building
33 Static object, post
34 Static object, curb
35 Static object, lane marker
36 Acquisition space
37 Drivable area, roadway area
38 Developed area, building fronts
39 Roadway edge area The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating an environmental model for a vehicle, comprising:
    acquiring an initial position estimate for the vehicle;
    acquiring map data based on the acquired initial position estimate, wherein the map data include information about a spatial arrangement of multiple geographical areas and the assignment of the geographical areas to one or more area categories;
    acquiring, using at least one sensor, environmental data within an acquisition space;
    detecting, using a processor, objects using the environmental data, wherein an object position and at least one object category are assigned to each detected object; and
    generating, using the processor, the environmental model using the detected objects and based on assignment rules, which assignment rules define one or more plausibility relationships between one or more object categories and one or more area categories; and
    controlling the vehicle using the environmental model;
    wherein
    generating the environmental model comprises:
        determining, using the one or more assignment rules, whether for at least one given object of the detected objects, a positive assignment or a negative assignment exists between the assigned object category of the given object and an area category at the assigned object position of the given object; and
        including the given object in the environmental model in case the positive assignment exists for the given object; otherwise
        not including the given object in the environmental model.

2. The method of claim 1, wherein the area categories include at least one drivable area, one undrivable area, one roadway area, one developed area, and/or one vegetation area.

3. The method of claim 1, wherein a precision of the initial position estimate is determined, and an arrangement of the geographic areas relative to the vehicle is determined depending on the precision.

4. The method of claim 1, wherein provisional detections are initially determined while detecting the objects, and the provisional detections are filtered using the assignment rules.

5. The method of claim 1, wherein a subset of the acquired environmental data is determined while detecting the objects using the assignment rules, and the objects are detected using the subset of the environmental data.

6. The method of claim 1, wherein the acquisition space in which the environmental data are acquired is formed using the assignment rules.

7. The method of claim 1, wherein the detected objects are static objects.

8. The method of claim 7, wherein the object categories are posts, stakes, traffic structures, elements of a peripheral development, road markers, signs, or traffic signals.

9. The method of claim 1, wherein an optimized position estimate for the vehicle is determined using the initial position estimate and the environmental model.

10. The method of claim 1, wherein the detected objects include dynamic objects.

11. The method of claim 1, wherein the map data are received at least partially by an external unit.

12. A non-transitory storage medium with instructions that, when executed by a processor, cause the processor to execute the method of claim 1.

13. The method of claim 2, wherein a precision of the initial position estimate is determined, and an arrangement of the geographic areas relative to the vehicle is determined depending on the precision.

14. The method of claim 2, wherein provisional detections are initially determined while detecting the objects, and the provisional detections are filtered using the assignment rules.

15. The method of claim 3, wherein provisional detections are initially determined while detecting the objects, and the provisional detections are filtered using the assignment rules.

16. A system for generating an environmental model for a vehicle comprising:
   a position acquisition receiver for acquiring an initial position estimate for the vehicle;
   a map data acquisition receiver for acquiring map data based on the acquired initial position estimate, wherein the map data include information on the spatial arrangement of multiple geographical areas and the assignment of the geographical areas to one or more area categories;
   an environmental data acquisition sensor for acquiring environmental data in an acquisition space;
   a processor with a detection circuit and an environmental model determining circuit; and
   a driver assistance system for at least partially autonomous control of the vehicle using the environmental model; wherein
   the detection circuit is configured for detecting objects using the environmental data and for assigning an object position and an object category to each detected object; and
   the environmental model determining circuit is configured for generating the environmental model using the detected objects and based on assignment rules, which assignment rules define one or more plausibility relationships between one or more object categories and one or more area categories; wherein generating the environmental model comprises:
      determining, using the one or more assignment rules, whether for at least one given object of the detected objects, a positive assignment or a negative assignment exists between the assigned object category of the given object and an area category at the assigned object position of the given object; and
      including the given objects in the environmental model in case the positive assignment exists for the given object; otherwise
      not including the given object in the environmental model.

17. The system of claim 16, wherein
the environmental data acquisition sensor comprises one or more of a lidar, a radar, an ultrasonic sensor, and a camera for visible or infrared light.

* * * * *